United States Patent [19]

Fransen

[11] Patent Number: 5,070,993
[45] Date of Patent: Dec. 10, 1991

[54] DEVICE FOR CONVEYING A STREAM OF ARTICLES TO A PROCESSING MACHINE

[75] Inventor: Adrianus A. J. Fransen, Vlaardingen, Netherlands

[73] Assignee: Tevopharm-Schiedam B.V., Schiedam, Netherlands

[21] Appl. No.: 560,156

[22] Filed: Jul. 31, 1990

[30] Foreign Application Priority Data

Sep. 19, 1989 [NL] Netherlands .................. 8902341

[51] Int. Cl.$^5$ ............................................. B65G 47/26
[52] U.S. Cl. ................................. 198/419.3; 198/460
[58] Field of Search ................ 198/419.2, 419.3, 460

[56] References Cited

U.S. PATENT DOCUMENTS

| | | | |
|---|---|---|---|
| 2,884,115 | 4/1959 | Farrer. | |
| 3,155,221 | 11/1964 | Griner | 198/419.3 |
| 3,190,434 | 6/1965 | Dardaine. | |
| 3,718,246 | 2/1973 | Dardaine et al. | 198/419.3 |
| 4,054,823 | 10/1977 | Watkin | 198/419.2 X |
| 4,210,237 | 7/1980 | Gram | 198/419.2 |
| 4,440,288 | 4/1984 | Thomas | 198/419.2 |
| 4,473,010 | 9/1984 | Dietz et al. | 198/460 X |
| 4,660,350 | 4/1987 | Hogenkamp | 198/419.3 X |
| 4,724,946 | 2/1988 | Cinotti. | |

FOREIGN PATENT DOCUMENTS

| | | | |
|---|---|---|---|
| 2145339 | 3/1973 | Fed. Rep. of Germany | 198/419.3 |
| 2333734 | 1/1975 | Fed. Rep. of Germany. | |
| 3612104 | 10/1986 | Fed. Rep. of Germany. | |
| 0119621 | 9/1980 | Japan | 198/419.2 |
| 362650 | 7/1962 | Switzerland. | |

Primary Examiner—D. Glenn Dayoan
Attorney, Agent, or Firm—Webb, Burden, Ziesenheim & Webb

[57] ABSTRACT

Device for conveying a series of spaced apart articles to a processing machine, in particular these articles being formed to groups of a specific number comprising a drivable conveyor belt system with a run running essentially horizontally which can accommodate the series of articles, and which runs parallel to and at a distance from an endless chain on which a number of equally spaced drivers are mounted the drivers being movably mounted in such a way that they are placed only after passing a control element in a position projecting relative to of the conveyor belt system between articles lying thereon, which control element is fitted so that it can move to and fro over at least a portion of the run of the endless chain parallel thereto and is coupled to a first device which can give a signal for each passing or incoming article, and near the downstream end of the chain a fixed second device is present which for every passing group of articles can give a multiple "p" of these signals, so that these signals are a measure of the number of outgoing articles, and a comparison device is present, to which the signals of the first and second devices can be fed, by which device the speed of the endless chain and the position of the control element are controlled, the position being dependent on the ratio "N" between the number of incoming and the number of outgoing articles, and it being possible for "N" to vary between a value of zero and a value of at least 1.

5 Claims, 4 Drawing Sheets

DEVICE FOR CONVEYING A STREAM OF ARTICLES TO A PROCESSING MACHINE

The invention relates to a device for conveying a stream of articles spaced apart to a processing machine, in particular a stream of articles coming out of a first or producing machine, in particular these articles being formed to groups of a specific number, comprising an endless chain or similar mechanism which can be driven by the processing machine and on which a number of equally spaced drivers are mounted, and of which one run, running essentially horizontally, extends between the first machine and the processing machine. Such a device is known from U.S. Pat. No. 4,660,350.

BACKGROUND OF THE INVENTION

A device of this type is suitable in particular for use in a plant for the production of so-called multi-packs, in other words, packs each containing a number of individually packed articles, so that such a plant comprises a single-pack machine for the production of packed single articles, a transfer device which is also a group former of the type mentioned in the preamble, and a multi-pack machine for the production of multi-packs. The single-pack machine produces a continuous stream of packed articles which are transferred by the transfer device to the multi-pack machine, so that the speeds of these machines and those of the transfer machine have to be synchronized. The stream of packed articles produced by the single-pack machine is, however, not always constant, since this machine has a facility for blowing rejected packs out of the stream of packed articles and the production speed of this machine depends on the supply thereto of single articles to be packed. The speeds of the transfer device and of the multi-pack machine will therefore have to be capable of varying. However, sudden changes in speed from a specific speed to zero speed and vice versa are not possible in this case. The transfer device therefore also serves as a buffer in which articles can be buffered when the stream of articles coming out of the single-pack machine suddenly begins or decreases with gradually increasing speed of the multi-pack machine, and from which articles can be drawn for supplying the multi-pack machine at gradually decreasing speed whenever a gap occurs in the article supply stream, until this gap is filled up again by the single-pack machine which continues to supply packed articles at full speed.

In the known transfer device the above-mentioned run of the endless chain is guided in such a zigzag manner that between every two drivers a sag is present in the chain, said sags meaning an additional length of this run. In this case the endless chain is driven at one side by the producing machine and at the other side by the processing machine, said drives being synchronized by means of regulating devices. If a gap now occurs in the stream of articles supplied by the producing machine, then the drive of the endless chain is stopped by the producing machine, so that the sags are pulled approximately straight over a period of time by the other drive of the endless chain, with the result that the processing machine remains supplied, during which time the gap is filled up by the producing machine.

The disadvantage of this known device is that it cannot operate at relatively high speeds, since the masses of the chain and moving parts are too great for this. Moreover, in order to obtain great enough extra length of the endless chain, a relatively large number of sags must be present, as a result of which the straight length of the zigzag-shaped run of the endless chain becomes unacceptably great.

The object of the invention is to provide an improved device of the above-mentioned type.

SUMMARY OF THE INVENTION

This object is achieved through the fact that the device according to the invention comprises a drivable conveyor belt system with a run running essentially horizontally which can accommodate the stream of articles, in particular the stream of articles coming out of the producing machine, and which runs parallel to and at a distance from the above-mentioned run of the endless chain, while the drivers of said chain are movably mounted thereon in such a way that they are placed only after passing a control element in a position projecting relative to the above-mentioned run of the conveyor belt system between articles lying thereon, or an operating position, which control element is fitted so that it can move to and fro over at least a portion of the above-mentioned run of the endless chain parallel thereto and is coupled to first means which can give a signal for each passing or incoming article, and near the downstream end of the chain fixed second means are present which for every passing group of articles can give a multiple "p" of these signals, "p" being the selected number of articles of which each group to be formed must be constituted, so that these signals are a measure of the number of outgoing articles, and a comparison device is present, to which the signals of the two scanning elements can be fed, by which device the speed of the endless chain and the position of the control element are controlled, said position being dependent on the ratio "N" between the number of incoming and the number of outgoing articles, and it being possible for "N" to vary between a value of zero and a value of at least one.

When the device is in operation, the control element is in a position near the upstream end of the chain, for which position "N" is equal to one. In this case a buffer comprising a number of groups of articles is formed on the endless belt, each group lying behind an advancing driver of the chain which is in the operating position.

However, if a gap now occurs in the incoming stream of articles through, for example, one of these articles being blown away, then the first scanning element will give one signal fewer than normal, as a result of which "N" becomes lower than one, with the result that the control element is moved downstream, so that the driver which in the case of a normal number of signals from the first scanning element would have been placed in the operating position now moves into the non-operating position behind the advancing control element, until the next article supplied on the belt passes the first scanning element, as a result of which the number of signals has become normal again. The control element is then stopped, so that the above-mentioned driver is put into the operating position behind a number, the set number, of articles forming a group. The incoming stream of articles is thereafter, for example, normal again.

In the meantime, the processing machine continues to be supplied from the above-mentioned buffer, but at a declining speed, so that the number of outgoing articles per unit time becomes smaller until the stream of incoming articles is normal again, so that the buffer has to accommodate articles, the consequence of which is that the control element is returned to its original position, as a result of which the buffer grows until the normal number of buffered groups of articles and the value of "N" becomes one again and the speed of the processing machine increases to the normal speed.

In the case of the device according to the invention the masses to be accelerated and to be slowed down are small, since they are formed only by the control element and the scanning element coupled thereto and, for example, a toothed belt, two deflection rollers and a motor rotor.

The above-mentioned second means are preferably in the form of a scanning element which can give the above-mentioned multiple "p" signals each time a driver in the operating position passes this element, since it is certain when the device is in operation that one group of "p" articles is at each driver running through the downstream end of the chain.

The conveyor belt system preferably comprises two conveyor belts situated next to each other with a space between them, so that two runs of these belts running essentially in one horizontal plane are separated from each other by a space between them, the drivers of the endless chain projecting through said space when in their operating position.

Each driver is advantageously formed by a generally L-shaped member, which is rotatably connected to the endless chain at a point on one leg, a limit being present towards both sides of said rotary movement, so that the member can swing between two positions, these positions being fixed by a spring-loaded element which is pressed against such a curved surface that during the swinging of the member from one position to the other this element passes the highest point of said surface, and a follower roller is fitted near the place where the two legs of the member meet. The control element is in this case formed by a run-on face up which the follower roller can run.

BRIEF DESCRIPTION OF THE DRAWINGS

The invention will be explained in greater detail with reference to the drawing, in which.

DESCRIPTION OF THE PREFERRED EMBODIMENTS

Figure 1:
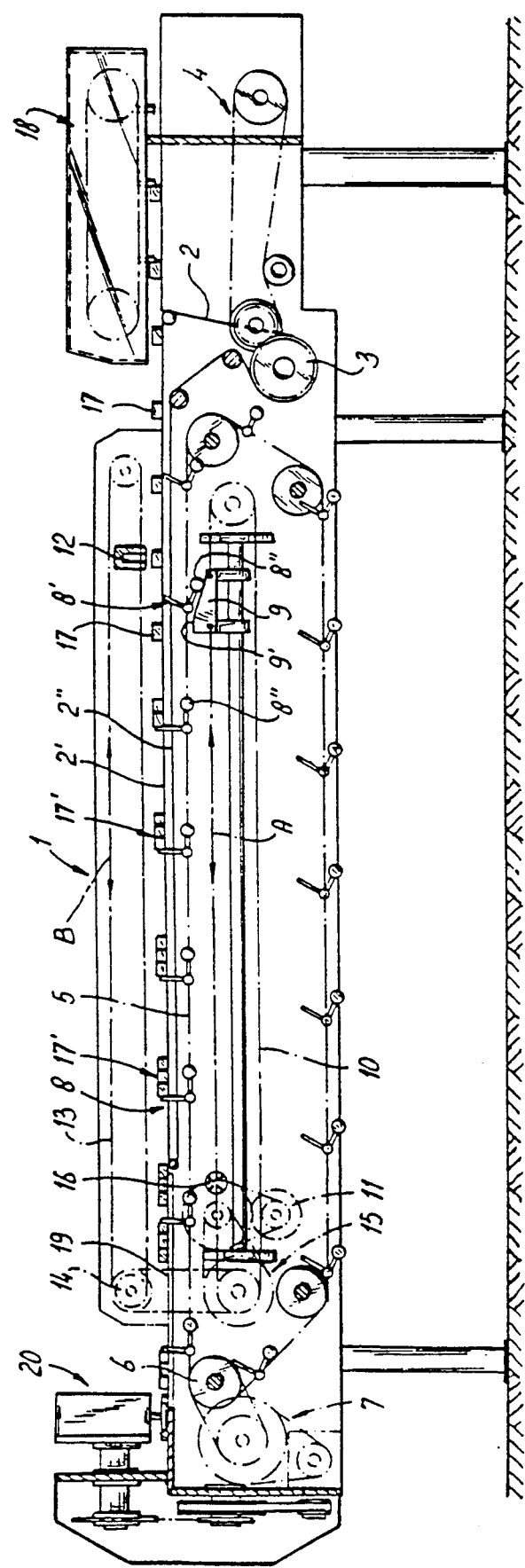
FIG. 1 shows in side view an embodiment of the device according to the invention.
Figure 2:
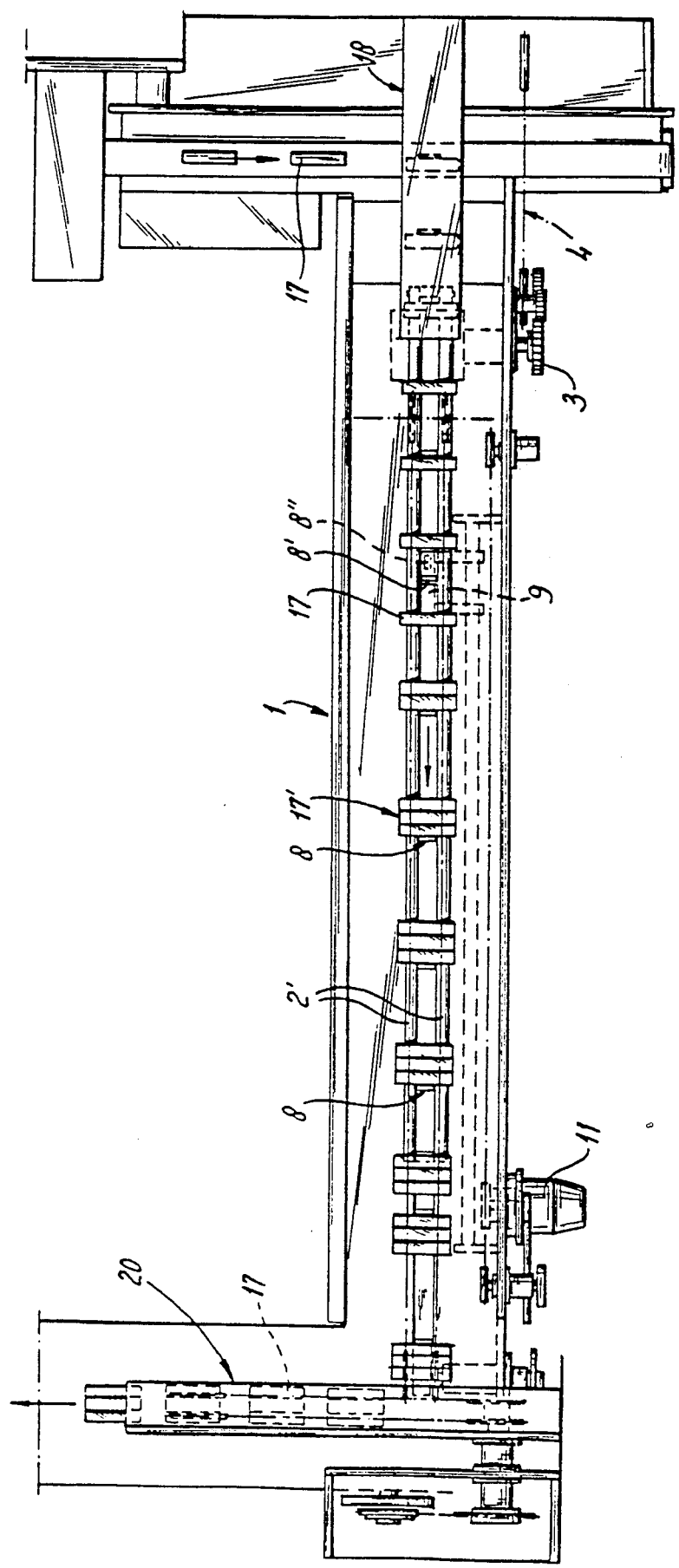
FIG. 2 shows this device in top view.

As shown in FIGS. 1 and 2, the transfer device 1 extends between a packaging machine (not shown), to the right in the figures, delivering a stream of individually packed articles, and a packaging machine to the left in the figures, packing groups of three of these articles.

The device 1 comprises two adjacent conveyor belts 2, each having an upper run 2' and a lower run 2". These conveyor belts are driven by means of the pulley 3 which is driven by means of the transmission 4 from the single-pack machine.

The device 1 also comprises an endless chain 5, driven by means of the chain wheel 6 which is driven by means of the transmission 7 from the multi-pack machine. Fitted on this chain are drivers 8, which are situated at equal intervals and which can swing between two positions, i.e. the position shown by reference number 8, in which position the drivers project upwards through the space between the conveyor belts until they are past the upper runs 2' of the conveyor belts, and the position shown by the reference number 8', in which position the drivers do not project past the top parts 2'.

The drivers are taken out of the position 8' into the position 8 by means of the pawl 9, which is provided with a run-on face 9' up which the follower roller 8" of a driver 8 can run. The pawl 9 can be moved to and fro, by means of the toothed belt or endless chain 10, parallel to the conveyor belts 2 and the chain 5 in the direction of the double arrow A. The toothed belt 10 is driven here by the motor 11.

Fitted above the conveyor belts 2 is a photoelectric cell 12 which together with the pawl 9 is moved to and fro in the direction of the double arrow B, for which purpose the photoelectric cell 12 is mounted on an endless chain 13 which is driven by means of the pulley 14, this pulley 14 being driven by means of the transmission 15 by the motor 11. The photoelectric cell 12 is situated at a distance in front of the pawl which is approximately equal to half the length of an object 17.

A scanning device 16 is also fitted at a fixed point below the top part of the endless chain 5.

Figure 5:
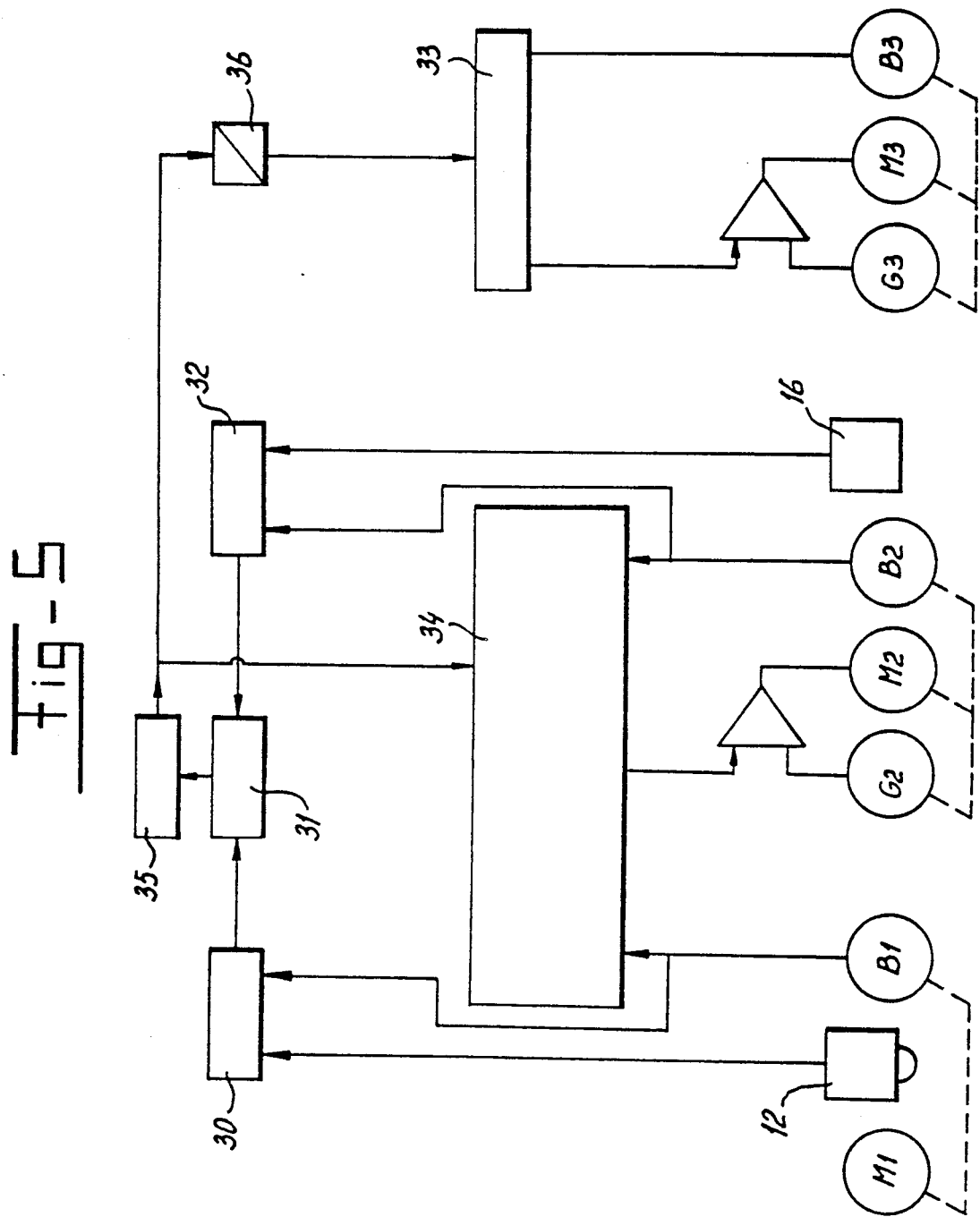
FIG. 5 shows a control diagram for the device according to the invention.

In FIG. 5 M1 and M2 indicate the motors which respectively drive the single-pack machine and thereby the endless belts 2, and the multi-pack machine, and thereby the endless chain 5, while the motor M3 corresponds to the motor 11. M1 and M2 are linked to the pulse emitters B1 and B2 respectively, B1 producing, for example, 1,000 pulses per single produced, singly packed article, and B2 producing, for example, 3,000 pulses per group of three articles. B3 is a position-measuring element for the pawl 9. G2 and G3 are tachogenerators. Reference number 30 indicates an increment counter which passes on 1,000 incrementing pulses given by B1 to a counter register 31 each time a signal is given by the photoelectric cell 12 as the result of an article passing it, while 32 indicates a decrement counter which passes on 3,000 decrementing pulses given by B2 to the counter register 31 each time a signal is given by the scanning device 16 as the result of a driver 8 in the operating position passing it. Reference number 33 indicates a positioning unit for positioning the pawl 9, while 34 is a synchronization regulator, 35 a transducer, and 36 a digital/analogue converter.

When the device is in operation a stream of individually packed articles 17 is produced by the single-pack machine, said articles then being transferred by the transverse conveyor 18 to the conveyor belts 2. When the photoelectric cell 12 is passed, said photoelectric cell gives for each article which has passed a signal or a number of pulses which increment the counting register 31. If, for example, each group of articles has to be made up of three of these articles, then after the passing of every three articles moving along the conveyor belts 2 a driver 8 is raised through said driver running along the pawl 9. Due to the fact that the endless chain 5 and thereby the drivers 8 move along at a speed which is lower than that of the conveyor belts 2, three articles 17 are always collected to a combined group 17 behind the drivers 8. At the end of the conveyor belts 2 the groups 17' are slid onto a table 19, so that a group 17' formed behind a driver is pushed forward over the table 19 by the following driver, following which these groups of articles 17' are transferred by the conveyor 20 to the multi-pack machine.

When a driver 8, in its raised position, passes the scanning element 16, said element in the example of an embodiment selected gives three signals or three times a number of pulses which decrement the above-mentioned counting register. The signals incrementing and decrementing the counting register 31 determine the value of the counting register, which value is proportional to the ratio N between the number of incoming articles, i.e. the articles which have passed the photoelectric cell 12, and the number of outgoing articles, i.e. the articles formed into groups which pass the scanning element 16. In addition, N is directly proportional to the place where the pawl 9 is situated, while N can vary between 0 and, for example, 1, 2, so that in the case of the first-mentioned value the pawl 9 is fully downstream, at the scanning element 16, and in the case of the second value the pawl 9 is fully upstream.

When the device shown starts operating from a standstill position, then a driver 8 in the operating position is near the scanner 16. The single-pack machine is then put into operation, so that the production speed thereof increases from zero to the set capacity of, for example, 540 articles per minute. The stream of articles fed in by the conveyor belts then passes the photoelectric cell 12, in which case 1,000 incrementing pulses are given to the counting register 31 each time one article passes, the result of which is that first of all the pawl 9, after three times 1,000 incrementing pulses, is moved over one chain pitch in the upstream direction, which places the next upstream driver in the operating position behind the first three articles and that, secondly, the multi-pack machine gradually goes into operation and the endless chain is thereby set in motion, so that outgoing articles are produced and decrementing pulses are fed into the counting register 31. Since the value N=1 is being striven for, so long as per unit time the number of incoming articles is greater than the number of outgoing articles, the pawl 9 will be moved further upstream, while after every 3,000 incrementing pulses a driver is placed in the working position, until the multi-pack machine is running as fast as the single-pack machine, so that per unit time the number of incoming articles is equal to the number of outgoing articles.

Figure 3:
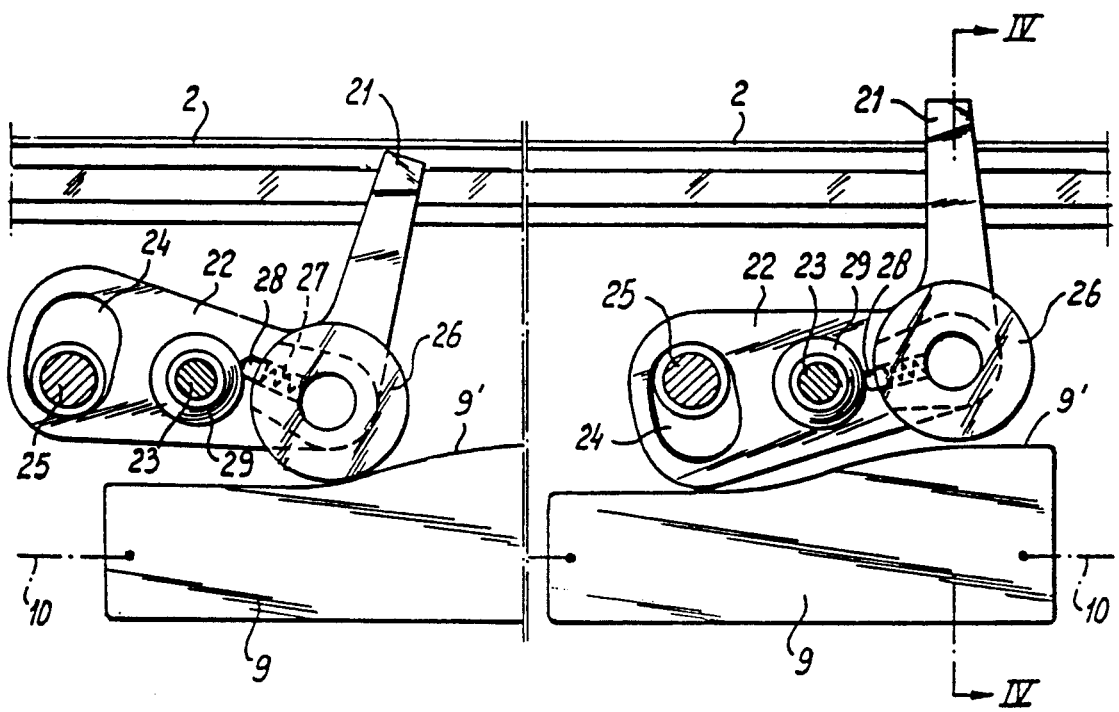
FIG. 3 shows two drivers on a larger scale.
Figure 4:
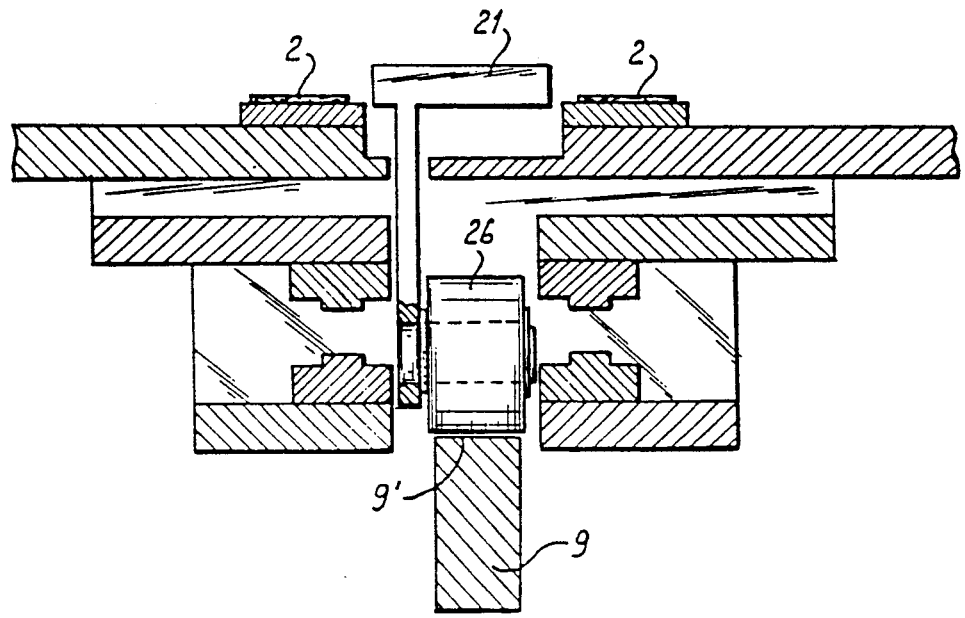
FIG. 4 is a section along the line IV—IV in FIG. 3.

As shown in FIGS. 3 and 4, each driver 8 is formed by an approximately L-shaped element, with a first leg 21 and a second leg 22. This element is rotatably connected to the chain 5 at 23, an elongated aperture 24 engaging around a pin 25 forming a limit for the swinging movement about the point 23 of the element. A follower roller 26 is also connected to the legs 21 and 22 and can run up against the run-on face 9' of the pawl 9, causing the element 21, 22 to be swung from the non-operating position shown on the left into the operating position shown on the right, in which position the leg 21 projects past the conveyor belts 2. In order to fix these two positions of the element 21, 22 a member 28 loaded by the pressure of a spring 27 is provided, the member 28 being passed against a bush 29, so that during swinging of the element 21, 22 the member 28 passes a dead point on the periphery of the bush 29.

I claim:

1. A transfer device for conveying a stream of spaced apart articles coming out of a first producing machine to a processing machine and forming the articles into groups of a specified number comprising an endless chain on which a number of equally spaced drivers are mounted, one run of which runs essentially horizontally between the first producing machine and the processing machine and is driven by the processing machine, a conveyor belt system with one run running essentially horizontal and at a distance from and parallel to the endless chain and adapted to receive articles coming out of the first producing machine, the drivers on the endless chain being movably mounted to swing into two positions, in one of which a working position a portion of the driver projects above said run of the conveyor belt system between articles on the conveyor belt system and in another position the driver is entirely below said run of the conveyor belt system, a control element mounted for movement back and forth parallel to the conveyor belt and endless chain and having a surface adapted to contact the driver and move it to and from said first position and second positions, a first signal means coupled to the control element which can give a signal for each passing or incoming article, a second signal means position near the downstream end of the chain which for every passing group of articles can give a multiple "p" of these signals, "p" being the selected number of articles of which each group to be formed must be constituted, so that these signals are a measure of the number of outgoing articles, and a comparison device, to which the signals of the above-mentioned first and second signal means are fed, by which comparison device the speed of the endless chain and the position of the control element are controlled, said position being dependent on the ratio "N" between the number of incoming and the number of outgoing articles, and it being possible for "N" to vary between a value of zero and a value of at least 1.

2. Device according to claim 1, in which the above-mentioned second signal means are in the form of a scanning element which can give the above-mentioned multiple "p" signals each time a driver in the operating position passes this element.

3. Device according to claim 1 or 2, in which the conveyor belt system comprises two conveyor belts situated next to each other with a space between them, so that two runs of these belts running essentially in one horizontal plane are separated from each other by a space between them, the drivers of the endless chain projecting through said space when in their working position.

4. Device according to claim 1 or 2, in which each driver is formed by a generally L-shaped member, which is connected for rotary movement to the endless chain at a point on one leg, a limit being present towards both sides of said rotary movement, so that the member can swing between two positions, these positions being fixed by a spring-loaded element which is pressed against a bushing surrounding the connection point to the chain so that during the swinging of the member from one position to the other this element passes the highest point of said bushing, and a follower roller is fitted near the place where the two legs of the member meet.

5. Device according to claim 4, in which the control element includes a run-on face up which the follower roller can run.

* * * * *